(12) United States Patent
Kohri et al.

(10) Patent No.: US 6,266,479 B1
(45) Date of Patent: Jul. 24, 2001

(54) VIDEO SIGNAL RECORDING AND REPRODUCING APPARATUS

(75) Inventors: Toshiyuki Kohri, Hirakata; Haruo Isaka, Yawata; Kenichi Honjo, Katano, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/242,113
(22) PCT Filed: Jun. 9, 1998
(86) PCT No.: PCT/JP98/02549
 § 371 Date: Feb. 9, 1999
 § 102(e) Date: Feb. 9, 1999
(87) PCT Pub. No.: WO98/57494
 PCT Pub. Date: Dec. 17, 1998

(30) Foreign Application Priority Data

Jun. 9, 1997 (JP) .................................................. 9-151088

(51) Int. Cl.$^7$ ............................... H04N 5/783; H04N 5/92
(52) U.S. Cl. ................................ 386/68; 386/69; 386/95; 386/117
(58) Field of Search ................................ 386/1, 6–8, 14, 386/16, 38, 46, 45, 68, 69, 70, 95, 86, 81, 117, 82, 88; 360/27, 72.1, 72.2; H04N 5/76, 5/92, 5/91, 9/79

(56) References Cited

U.S. PATENT DOCUMENTS 4,376,959 * 3/1983 Mori et al. .......................... 360/72.2
5,526,133 * 6/1996 Paff ..................................... 360/72.1
6,115,202 * 9/2000 Yoshida et al. ...................... 360/72.2

FOREIGN PATENT DOCUMENTS

| 1-65989 | * 3/1989 | (JP) | ................. H04N/5/91 |
| 1-206283 | * 8/1989 | (JP) | ................. G01B/9/02 |
| 5-83632 | * 4/1993 | (JP) | ................. H04N/5/225 |
| 6-66516 | * 3/1994 | (JP) | ................. G01B/9/02 |
| 8-5314 | * 1/1996 | (JP) | ................. G01B/9/02 |
| 8-111846 | * 4/1996 | (JP) | ................. H04N/5/915 |

* cited by examiner

*Primary Examiner*—Thai Tran
(74) *Attorney, Agent, or Firm*—Wenderoth, Lind & Ponack, L.L.P.

(57) ABSTRACT

The present invention is a video signal recording and reproducing apparatus for recording and reproducing video signals (SvN) inputted from a plurality (n) of different cameras (CMn). A frame switcher (2) sequentially selects one of the video signals (SvN) in prescribed order, and identifying signal adders (10a, 10b) add an identifying signal (Sid) representing a corresponding camera number (N) to the selected video signal (SvN) and generate recording signals (Sr1, Sr2). A recording signal processor (11) modulates the recording signals (Sr1, Sr2) and recording magnetic heads (16a, 16b) record them on a magnetic tape (4). Reproducing heads (15a, 15b) reproduce a recorded recording signal (Sr') from the magnetic tape (4) and a reproducing processor (14) demodulates the signal. A camera number detector (23) detects the identifying signal (Sid) from a demodulated video signal (Sr2'). Memory (24) stores the demodulated video signal (Sr2') in relation to the detected identifying signal (Sid), thereby allowing high-speed and normal-speed replay of video from a desired video signal source without video signals from a plurality of video signal sources mixed into.

19 Claims, 14 Drawing Sheets

VIDEO SIGNAL RECORDING AND REPRODUCING APPARATUS

TECHNICAL FIELD

The present invention relates to a video recording and reproducing apparatus for recording and reproducing a video signal from a plurality of cameras and a video recording and reproducing apparatus for generating a desired image from a plurality of images.

BACKGROUND ART

FIG. 14 shows a conventionally known surveillance recording and reproducing system having a frame switcher for switching video signals from a plurality of cameras for each frame for output and a recording-purpose VTR. Each video signal generated in a plurality of cameras CM1 to CMn (n is an integer more than 1) is selectively inputted to a recording signal output circuit 3 by a selection switch of a frame switcher 2. The recording signal output device 3 subjects the inputted video signal to signal processing such as continuity holding and modulation of an odd field, an even filed and a sub-carrier and the like to generate a recording signal, and records the recording signal on a magnetic tape 4.

The reproduction signal processor 5 reproduces the recording signal recorded on the magnetic tape 4, and subjects the reproduced recording signal to signal processing such as demodulation to reproduce a video signal. The reproduction signal processor 5 then inputs the reproduced video signal to memory 6 and a corrector 7. Memory 6 temporally holds the inputted video signal for one frame. When the present reproduction signal directly inputted from the reproduction signal processor 5 has an error, the corrector 7 uses a reproduction signal of the immediately preceding frame temporally held in memory 6 and corrects the error of the present reproduction signal to generate a corrected reproduction signal. The corrector 7 then inputs the corrected reproduction signal to a video signal output device 8. The video signal output device 8 converts the inputted corrected reproduction signal to a video signal according to a display device such as a monitor 9 and then inputs the video signal to the display device. The monitor 9 reproduces and displays an image by the inputted video signals.

In such surveillance recording and reproducing systems, when there is one camera, even if the reproduction signal reproduced and demodulated from the magnetic tape 4 by the reproduction signal processor 5 is replaced by reproduction signal information of the immediately preceding frame by the correcting means 7, their in-frame images therebetween has much correlation and therefore correction can be made without any problem. However, when there are a plurality of cameras, the video signals from each camera are recorded on the magnetic tape 4 and therefore the reproduction signals reproduced from the magnetic tape 4 by the reproduction signal processor 5 have video information different for each corresponding camera with much less correlation. Therefore, when the reproduction signal information of the immediately preceding frame is used in order to correct the reproduction signal with an error as described above, the video is disadvantageously replaced by the video information from a different camera without correlation, resulting in degradation in image quality after correction.

Therefore, an object of the present invention is to provide a video recording and reproducing apparatus capable of satisfactorily correcting an image of a reproduced image signal with an error even when video signals from a plurality of cameras are recorded.

Furthermore, FIG. 15 shows, as an example of conventional video recording and reproducing apparatuses, a surveillance recording and reproducing system, which is disclosed in JP-A-5-83632, having a frame switcher for switching video signals from a plurality of cameras CM1 to CMn for each frame for output and a recording-purpose VTR. Each video signal generated in the plurality of cameras CM1 to CMn (n is an integer more than 1) is selectively inputted to a recording signal output circuit 3 by a selection switch of a frame switcher 2. The recording signal output device 3 subjects the inputted video signal to signal processing such as continuity holding and modulation of an odd field, an even filed and a sub-carrier and the like and generates a recording signal which a video tape recorder 59 can record. The recording signal from the recording signal output device 3 is inputted to a superposition circuit 54, and a camera identifying signal representing a camera number is superimposed thereon in a vertical blanking period. The recording signal on which the camera identifying signal is superimposed is recorded by the video tape recorder 59. The camera number identifying signal superimposed on the signal reproduced from the video tape recorder 59 is detected by a reproduction signal processor 55. Based on the detected camera number identifying signal, a video signal only during a video period of an arbitrarily desired camera is identified and selected, and the video signals for one frame are temporally held in memory 56. At this time, the video signals of video signal periods of the other cameras are not recorded in memory 56, but only video signals of the same camera are read while being sequentially recorded in memory 56 and the video signals of the same camera outputted from a video signal output device 57 is displayed on a monitor 58. This allows selection and playback of only the video of the arbitrary camera.

In the video recording and reproducing apparatus structured as described above, if the video tape of the video tape recorder 59 runs at normal single speed during playback, it is possible to detect the camera number identifying signal superimposed on the video signal reproduced from the video tape recorder 59 and inputted to an identifying device 55. Therefore, images recorded by a desired camera can be selected and watched among images recorded by the plurality of cameras. However, since the camera number identifying signal is superimposed in the vertical blanking period, it is difficult to accurately detect the camera number identifying signal during high-speed replay where a magnetic tape speed is made high for fast-forward or in reverse. As a result, high-speed replay of only the images from the desired camera number is very difficult, and actually, impossible.

Furthermore, even when there is one camera, since the tape is controlled only at a desired speed during high-speed replay at more than single speed, uniform playback of the recorded video from the camera is very difficult and actually impossible.

Therefore, an object of the present invention is to provide a video recording and reproducing apparatus capable of high-speed replay of only recorded video by a desired camera even when video signals by a plurality of cameras are recorded, uniform high-speed replay of the recorded video of the camera, and further satisfactorily correcting an image even when a reproduced image signal has an error.

DISCLOSURE OF THE INVENTION

The present invention is directed to a video signal recording and reproducing apparatus for recording and reproducing first video signals inputted from the prescribed number of different video signal sources, comprising:

a first selecting portion for sequentially selecting one of the first video signals in prescribed order;

identifying signal adding portion for adding to the first signal selected by the first selecting portion an identifying signal representing the corresponding video signal source to generate a second video signal;

a recording signal processing portion for recording the second video signal on a magnetic tape;

a recording signal reproducing portion for reproducing the recorded second signal from the magnetic tape to generate a third video signal;

a reproduction signal processing portion for demodulating the third video signal to generate a fourth video signal;

an identifying signal detecting portion for detecting the identifying signal from the fourth video signal; and a memory portion for storing the fourth video signal in relation to the detected identifying signal.

As described above, in the first aspect of the present invention, the video signal is recorded in memory according to the identifying information of the video signal source. It is therefore possible to playback video from a desired video source at high speed and normal speed without video signals from a plurality of video signal sources mixed into.

According to a second aspect of the present invention, in the first aspect, the apparatus comprises a correcting portion for correcting, when the fourth video signal has an error, the error based on the reproduction signal and a reproduction signal outputted from the memory portion to generate a fifth video signal, and the correcting portion corrects the fourth video signal using the video signal of the video signal source selected based on the detected identifying signal.

In the second aspect of the present invention, error correction of a reproduced video signal is made according to the identifying information of the video signal source. It is therefore possible to correct video of a plurality of different video signal sources.

According to a third aspect of the present invention, in the second aspect, the apparatus further comprises a digital signal processing portion for dividing the first video signal for each recording unit to generate a fifth video signal having a plurality of recording units; and the identifying signal adding portion adds to the fifth video signal the identifying signal representing a corresponding video signal source for each recording unit to generate the second video signal.

In the third aspect of the present invention, the identifying information of the video signal source is divided and added. It is therefore possible to correctly identify desired video even at high-speed replay.

According to a fourth aspect of the present invention, in the third aspect, the digital signal processing portion adds a synchronization signal region and a synchronization signal auxiliary information region to each recording unit of the fifth video signal.

According to a fifth aspect of the present invention, in the fourth aspect, the digital signal processing portion further adds a video additional information region to each recording unit of the fifth video signal.

In the fifth aspect of the present invention, the identifying information of the video signal source can be added also to the video additional information region. It is therefore possible to reproduce video from more video signal sources at normal speed, compared with the fourth aspect.

According to a sixth aspect of the present invention, in the fifth aspect, the identifying signal adding portion comprises:

a first identifying signal adding portion for adding a first identifying signal to the synchronization signal region; and a second identifying signal adding portion for adding a second identifying signal to the video additional information region;

the identifying signal detecting portion comprises:

a first identifying signal detecting portion for detecting the first identifying signal from the fourth video signal;

a second identifying signal detecting portin for detecting the second identifying signal from the fourth video signal; and a second selecting portion for selecting the first and second identifying signals;

the memory portion stores in relation to the selected identifying signal selected by the second selecting portion from among the first and second identifying signals; and when the fourth video signal has an error, the correcting portion corrects the error of the video signal of the selected video signal source based on the fourth video signal and the video signal stored in the memory portion based on the identifying signal selected by the second selecting portion, and further switches a switching portion so as to output the first identifying signal during high-speed replay and the second identifying signal during normal replay.

In the sixth aspect of the present invention, the identifying signals are switched for high-speed replay and normal replay, thereby allowing correct video reproduction at high speed and normal speed.

According to a seventh aspect of the present invention, in the third aspect, the correcting portion detects an uncorrectable error in the fourth video signal for each of the recording units and generate an error correction disabled flag; and the memory portion does not store a corresponding recording unit of the fourth video signal based on the error correction disabled flag.

According to an eighth aspect of the present invention, in the first aspect, the apparatus further comprises a tape control portion for controlling running of the magnetic tape at a desired speed; and the memory portion stores the fourth video signal corresponding to the desired video signal source based on the identifying signal.

According to a ninth aspect of the present invention, in the eighth aspect, the apparatus further comprises a digital signal processing portion for dividing the first video signal for each recording unit to generate a fifth video signal having a plurality of recording units and also to add a synchronization signal region and a synchronization signal auxiliary region to each recording unit; and the identifying signal adding portion adds an identifying signal representing a video signal source to the synchronization signal additional information region.

A tenth aspect of the present invention is directed to a video signal recording and reproducing apparatus for recording and reproducing first video signals inputted from the prescribed number of different video signal sources, comprising:

a first selecting portion for sequentially selecting one of the first video signals in prescribed order;

a video signal source information modulation portion for modulating video signal source identifying information representing a selected video signal source to generate a control signal and also to record the control signal on a control track of a magnetic tape;

a recording signal processing portion for recording a second video signal on the magnetic tape;

a recording signal reproducing portion for reproducing the recorded second video signal from the magnetic tape to generate a third video signal;

a reproduction signal processing portion for demodulating the third video signal to generate a fourth video signal;

an identifying signal detecting portion for detecting an identifying signal from the fourth video signal;

a memory portion for storing the fourth video signal in relation to the detected identifying signal; and a control signal reproducing portion for reproducing the control signal from the control track.

In the tenth aspect of the present invention, the video signal is recorded in memory according to the identifying information of the video signal source. It is therefore possible to playback video from a desired video source at high speed and normal speed without video signals from a plurality of video signal sources mixed into.

According to an eleventh aspect of the present invention, in the tenth aspect, the apparatus further comprises a tape control portion for controlling running of the magnetic tape at a desired speed; and the memory portion stores the fourth video signal corresponding to a desired video signal source based on the identifying signal.

According to a twelfth aspect of the present invention, in the ninth aspect, the apparatus comprises a scan position detecting portion for detecting a scan position in a frame where the identifying signal representing the video signal source is recorded and generating a scan position signal; and the tape control portion controls running of the magnetic tape so as to vary a frame phase for each scanning based on a frame phase position signal.

According to a thirteenth aspect of the present invention, in the eighth aspect, the apparatus comprises a scan position detecting portion for detecting a scan position in a frame where the identifying signal representing the video signal source is recorded and generating a scan position signal; and the tape control portion controls running of the magnetic tape so as to vary a frame phase for each scanning based on the frame phase position signal.

According to a fourteenth aspect of the present invention, in the eleventh aspect, the apparatus comprises a scan position detecting portion for detecting a scan position in a frame where the identifying signal representing the video signal source is recorded and generating a scan position signal; and the tape control portion controls running of the magnetic tape so as to vary a frame phase for each scanning based on the frame phase position signal.

In the twelfth, thirteenth, and fourteenth aspects, the running of the magnetic tape is controlled so that the frame phase is sequentially varied, allowing sequential update of the video signal source of the displayed video.

According to a fifteenth aspect of the present invention, in the thirteenth aspect, the scan position detecting portion comprises:

a control signal detecting portion for recording and reproducing the control signal on the control track;

a capstan signal detecting portion for detecting a rotation frequency of a capstan motor and generating a capstan FG signal;

a counting portion for counting based on the capstan FG signal and generating a pulse count signal, being reset with the reproduced control signal; and a sampling portion for sampling the pulse count signal at timing of switching between reproducing heads.

According to a sixteenth aspect of the present invention, in the fourteenth aspect, the scan position detecting portion comprises:

a control signal detecting portion for recording and reproducing the control signal on the control track;

a capstan signal detecting portion for detecting a rotation frequency of a capstan motor and generating a capstan FG signal;

a counting portion for counting based on the capstan FG signal and generating a pulse count signal signal, being reset with the reproduced control signal; and a sampling portion for sampling the pulse count signal at timing of switching between reproducing heads.

According to a seventeenth aspect of the present invention, in the thirteenth aspect, the scan position detecting portion comprises:

a tracking error detecting portion for detecting a pilot signal recorded in a track of the magnetic tape and generating a tracking error signal; and a sampling portion for sampling the tracking error signal at prescribed timing; and detects frame position information based on the tracking error signal sampled by the sampling portion.

According to an eighteenth aspect of the present invention, in the fourteenth aspect, the scan position detecting portion comprises:

a tracking error detecting portion for detecting a pilot signal recorded in a track of the magnetic tape and generating a tracking error signal; and a sampling portion for sampling the tracking error signal at prescribed timing; and detects frame position information based on the tracking error signal sampled by the sampling portion.

According to a nineteenth aspect of the present invention, in the eighth aspect, the apparatus comprises a frame retrieving portion for retrieving a frame corresponding to a desired video signal source based on the detected identifying signal; and the apparatus slow-replays the frame which the frame retrieving portion retrieves at a first speed not more than single speed, and repeats frame search at a second speed faster than the first speed, thereby allowing high-speed reproduction of a video signal of a desired camera number without noise.

In the nineteenth aspect, the identifying information of the video signal source is detected and then the corresponding frame is retrieved, thereby allowing high-speed reproduction without noise.

According to a twentieth aspect of the present invention, in the eleventh aspect, the apparatus further comprises a frame retrieving portion for retrieving a frame corresponding to a desired video signal source based on the detected identifying signal; and the apparatus slow-replays the frame which the frame retrieving portion retrieves at a first speed not more than single speed, and repeats frame search at a second speed faster than the first speed, thereby allowing high-speed reproduction of a video signal of a desired camera number without noise.

BEST MODE FOR CARRYING OUT THE INVENTION

The present invention is now described in more detail according to the accompanying drawings.

(First Embodiment)

Figure 1:
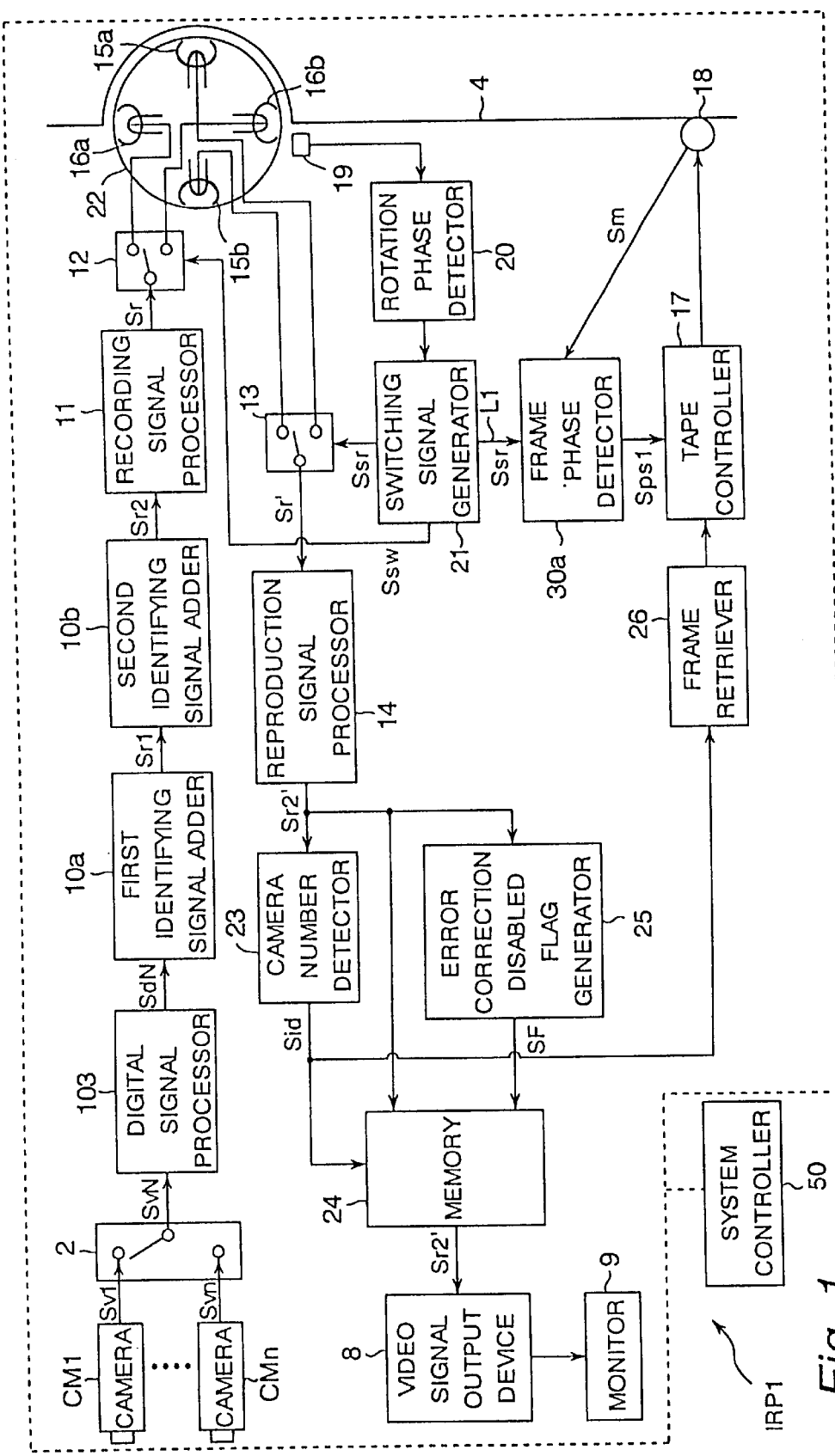
FIG. 1 is a block diagram showing a first preferred video recording and reproducing apparatus according to the present invention.

Described below is a video recording and reproducing apparatus according to a first embodiment of the present invention referring to FIGS. 1 to 6. As shown in FIG. 1, a video recording and reproducing apparatus IRP1 according to the first embodiment includes a plurality of cameras CM1 to CMn (n is an integer more than 1), a frame switcher 2, a video signal output device 8, a monitor 9, a digital signal processor 103, a first identifying signal adder 10a, a second identifying signal adder 10b, a recording signal processor 11, a recording head selection switch 12, a reproducing head selection switch 13, a reproduction signal processor 14, a first reproducing magnetic head 15a, a second reproducing magnetic head 15b, a first recording magnetic head 16a, a second recording magnetic head 16b, a tape controller 17, a capstan motor 18, a cylinder FG detector 19, a rotation phase detector 20, a switching signal generator 21, a cylinder 22, a camera number detector 23, memory 24, an error correction disabled flag generator 25, a frame retriever 26, a frame phase detector 30a, and a system controller 50 which controls operation of these components.

Figure 2:
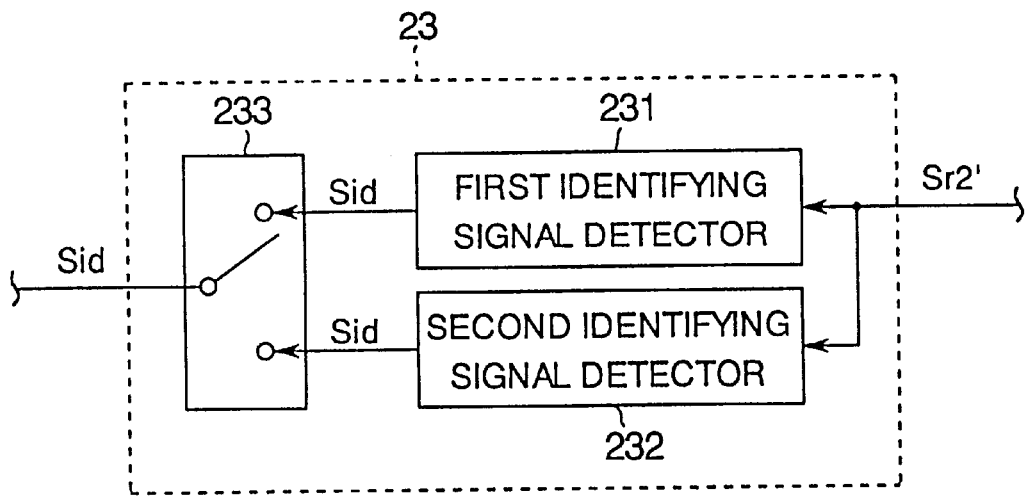
FIG. 2 is a block diagram showing the structure of a camera number detector shown in FIG. 1.

Described next is the structure of the camera number detector 23 referring to FIG. 2. The camera number detector 23 has a first identifying signal detector 231, a second identifying signal detector 232, and a selection switch 233. The first identifying signal detector 231 and the second identifying signal detector 232 are both connected to the reproduction signal processor 14 to decode an inputted demodulated reproduction signal and reproduce an identifying signal Sid which will be described later. The selection switch 233 selects either the first identifying signal detector 231 or the second identifying signal detector 232 and supplies its output to the memory 24 and the frame retriever 26.

Figure 3:
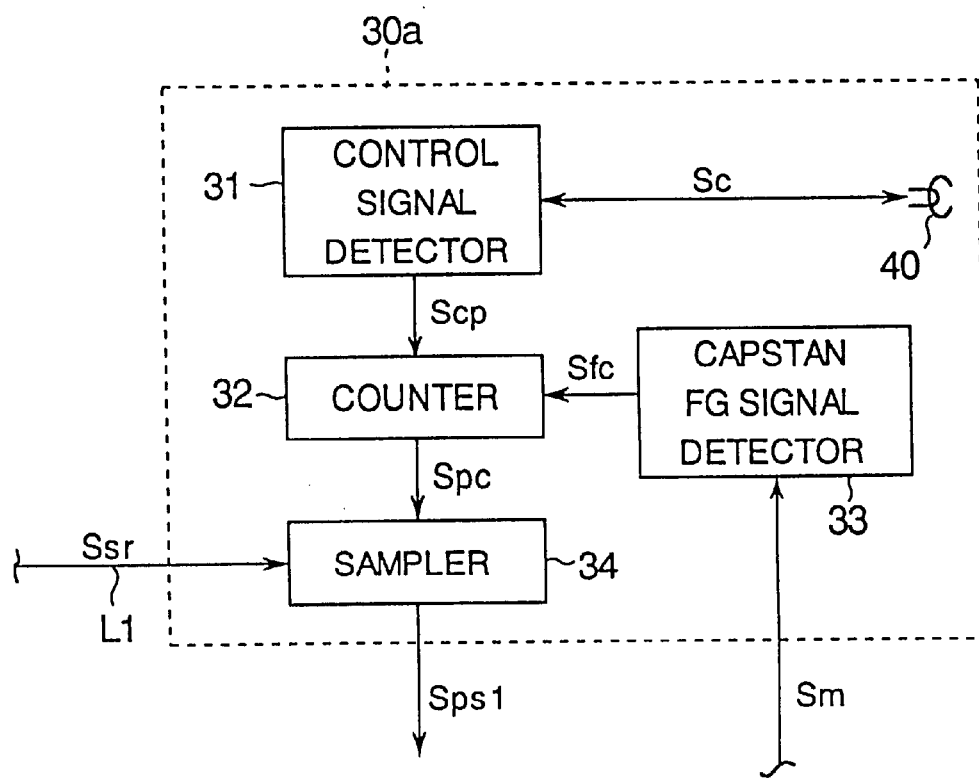
FIG. 3 is a block diagram showing the structure of a frame phase detector shown in FIG. 1.

Described next is the structure of the frame phase detector 30a referring to FIG. 3. The frame phase detector 30a includes a control signal detector 31, a counter 32, a capstan FG signal detector 33, a sampler 34, and a control head 40. The control head 40 is provided in the vicinity of a magnetic tape 4 to record and reproduce a control signal Sc having a period of one frame on the magnetic tape 4. The control signal detector 31 is connected to the control head 40 to obtain the input of the control signal Sc. The control signal detector 31 then generates a control pulse signal Scp having a period of one frame based on the inputted control signal Sc. The capstan FG signal detector 33 magnetically detects a rotational state (Sm) of the capstan motor 18 to generate a capstan FG signal Sfc having a pulse waveform. The counter 32 is connected to the control signal detector 31 and the capstan FG signal detector 33 to obtain the inputs of the control signal Scp and the capstan FG signal Sfc.

The counter 32 then counts pulses of the capstan FG signal Sfc to generate a pulse count signal Spc. Furthermore, the counter 32 resets the pulse count of the capstan FG signal Sfc by the control signal Scp. The sampler 34 is connected through a line L1 to the switching signal generator 21 to obtain an input of a reproducing head switching signal Ssr which will be described later, and also connected to the counter 32 to obtain the input of the pulse count signal Spc. The sampler 34 samples the pulse count signal Spc based on the reproducing head switching signal Ssr to generate a scan position signal Sps1. This scan position signal Sps1 is a signal representing which position of the frame the reproducing head is scanning.

Figure 4:
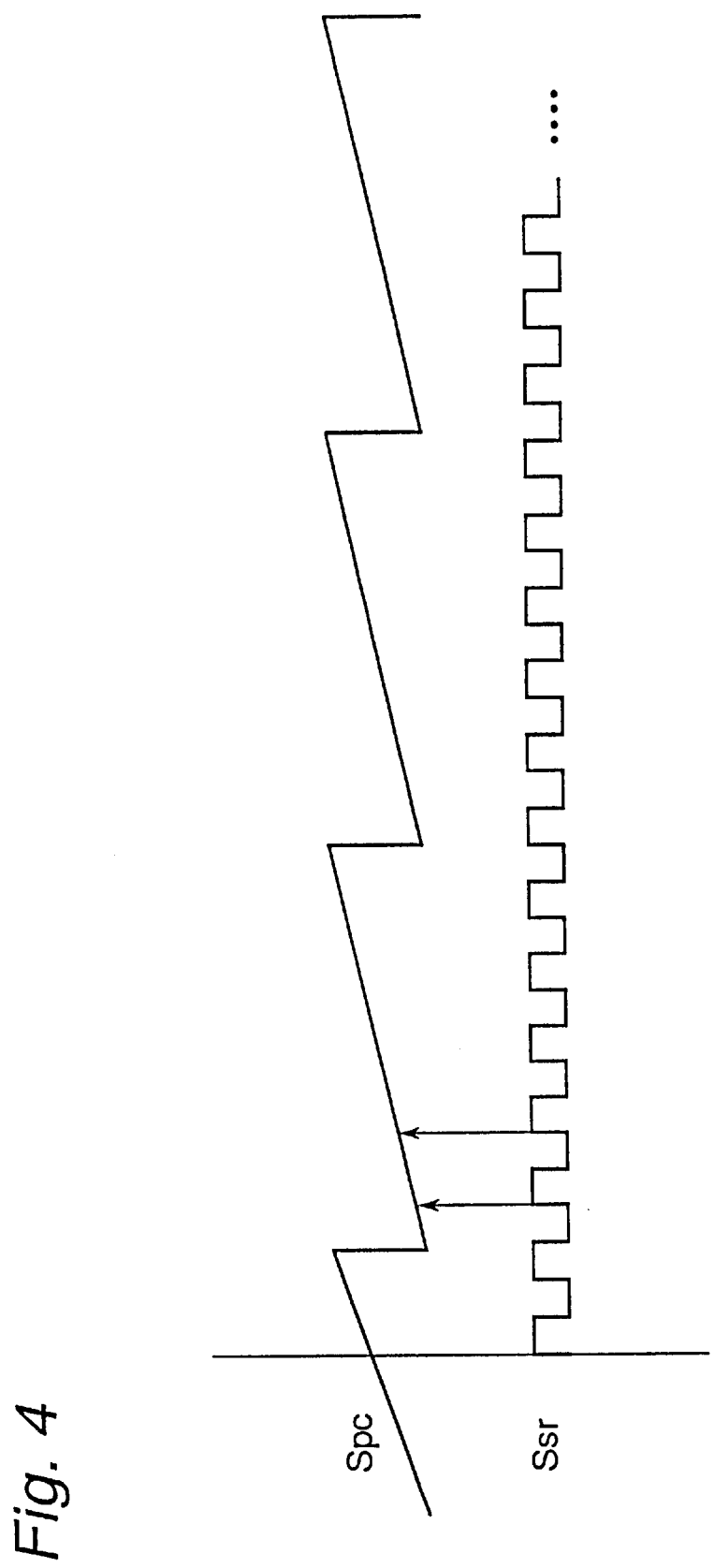
FIG. 4 is a descriptive diagram showing operation of a sampler shown in FIG. 1.

FIG. 4 shows the relationship between the reproducing head switching signal Ssr and the pulse count signal Spc. In the drawing, the value of the pulse count signal Spc itself represents the position where the reproducing magnetic head 15a (15b) is scanning on the magnetic tape 4. Therefore, as shown by arrows, the value of the pulse count signal Spc corresponding to each rising edge of the reproducing head switching signal Ssr is measured to obtain the scan position signal Sps1. In the present embodiment, although the pulse count signal Spc is sampled with the rising edge of the head switching signal Ssr, sampling may be made with another timing such as with each trailing edge.

Figure 5:
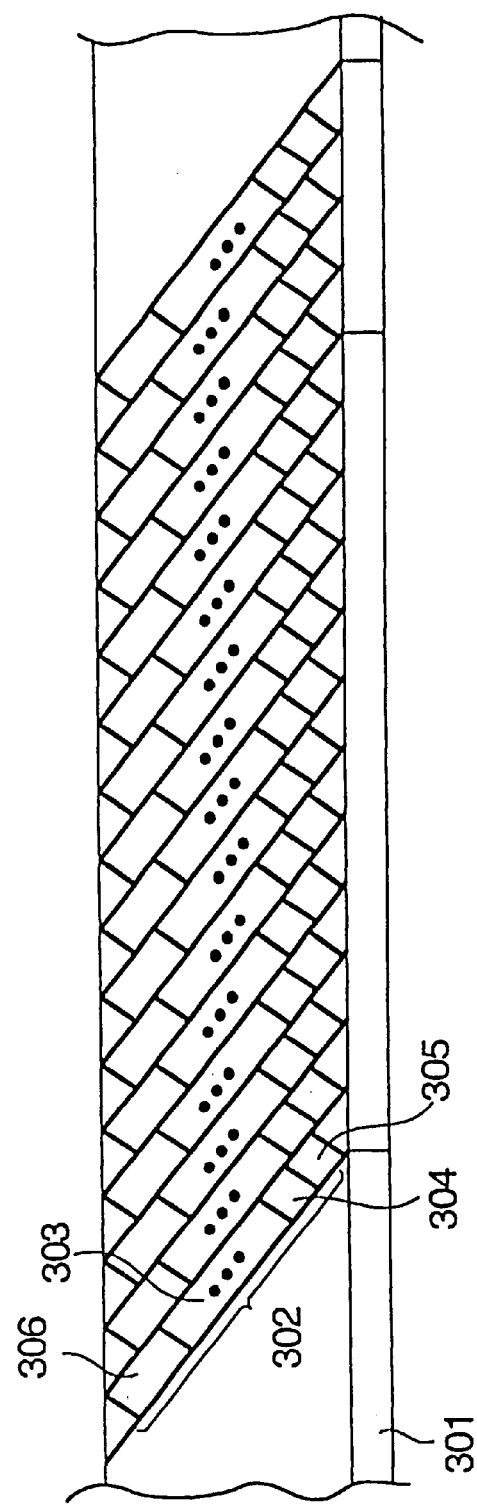
FIG. 5 is a descriptive diagram showing a recording pattern of a video signal recorded on a magnetic tape according to the present invention.

Described below is a recording pattern of a video signal to be recorded on the magnetic tape 4 referring to FIGS. 5 and 6. As shown in FIG. 5, formed in the lower part of the magnetic tape 4 along the running direction is a control track 301, to which information for a frame period is added. A plurality of tracks 302 on which information is recorded are formed along the running direction of the magnetic head of the magnetic tape 4. Each track 302 is divided into a tracking information region 305, a video region 303, an audio region 304, and a sub-code region 306.

Figure 6:
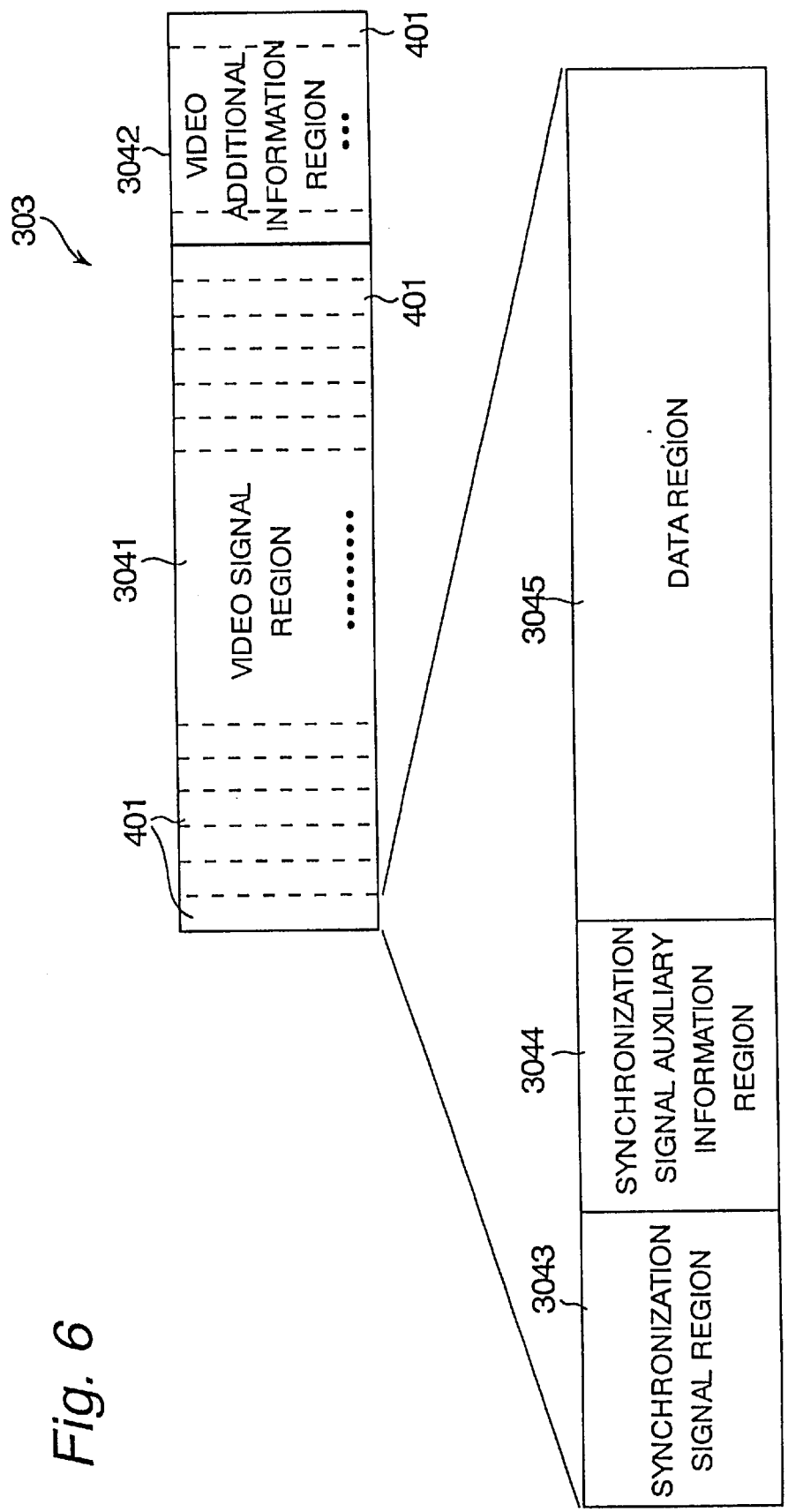
FIG. 6 is a schematic diagram showing the structure of a video region shown in FIG. 5.

As shown in FIG. 6, the video region 303 is divided into a video signal region 3041 and a video additional information region 3042. Including these video signal region 3041 and video additional information region 3042, the video region 303 is structured of a plurality of recording unit blocks 401. As schematically shown in FIG. 6, the number of recording unit blocks 401 structuring the video signal region 3041 is much larger than the number of recording unit blocks 401 structuring the video additional information region 3042. The recording unit block 401 is structured of a synchronization signal region 3043, a synchronization signal auxiliary information region 3044, and a data region 3045. Recorded in the synchronization signal region 3043 is synchronization signal data for recognizing a recording position; recorded in the synchronization signal auxiliary information region 3044 is information such as a track number in the frame, a block number in the track and the like; and recorded in the data region 3045 is video data.

Returning back to FIG. 1, the plurality of television cameras CM1 to CMn each shots a subject to generate video signals Sv1 to Svn, respectively. The frame switcher 2 is connected to the television cameras CM1 to CMn and also sequentially selects a television camera CMN (N is an integer not less than 1 and not more than n) from among the television cameras CM1 to CMn to output a video signal SvN generated in the selected television camera CMN. In general, the frame switcher 2 sequentially selects from among the television cameras CM1 to CMn for each predetermined time so that N of the television camera CMN is incremented by 1, thereby sequentially switching and outputting the video signals Sv1 to Svn. The digital signal processor 103 is connected to the frame switcher 2 to A/D convert the inputted video signal SvN, and also divides the signal by each recording unit block 401 and adds the synchronization signal region 3043 and the synchronization signal auxiliary information region 3044 for each recording unit to generate a digital video signal SdN.

The first identifying signal adder 10a is connected to the digital signal processor 103 and adds an identification number of the television camera CMN to the synchronization signal auxiliary information region 3044 of the video region 303 of the digital video signal SdN to generate a first recording signal Sr1. The second identifying signal adder 10b is connected to the first identifying signal adder 10a and adds the above identifying signal Sid to each video additional information region 3042 of the recording unit block 401 of the first recording signal Sr1 to generate a second recording signal Sr2. In this fashion, the identifying signal adders 10a and 10b forms identifying signal adding means for adding a camera number identifying signal N to the video signal in order to identify the video signal SvN selected by the frame switcher 2 as coming from the camera CMN.

The recording signal processor 11 is connected to the second identifying signal adder 10b and subjects the second recording signal Sr2 to processing such as modulation for recording the signal on the magnetic tap 4 and the like to generate a recording signal Sr.

The recording head selection switch 12 has one input port connected to the recording signal processor 11, two output ports connected to the recording magnetic heads 16a and 16b mounted on the cylinder 22 and opposed to each other approximately 180 degrees, one input port, and a selection switch which selectively connects the input port to one of the two output ports. The selection switch is connected to the switching signal generator 21, and, in response to an input of a recording head selection signal Ssw synchronizing with the cylinder 22, selects one of the two recording magnetic heads 16a and 16b to provide it with the recording signal Sr from the recording signal processor 11. The reproducing head selection switch 13 has a similar structure to that of the recording head selection switch 12, except for having one output port and two input ports. These two input ports are respectively connected to the reproducing magnetic heads 15a and 15b mounted on the cylinder 22 and opposed to each other approximately 180 degrees, while the one output port is connected to the reproduction signal processor 14. The reproducing head selection switch 13 drives the selection switch based on the head switching signal Ssr to selectively output a reproduction signal Sr' from one of the two reproducing heads 15a and 15b.

The cylinder FG detector 19 is mounted in the vicinity of the cylinder 22, magnetically detecting a rotational state of the cylinder 22 to generate a rotation detection signal. The rotation phase detector 20 is connected to the FG detector 19, detecting a rotation phase of the cylinder 22 based on the rotation detection signal inputted from the cylinder FG detector 19 to generate a rotation phase detection signal. The switching signal generator 21 is connected to the rotation phase detector 20, generating a recording head switching signal Ssw to output it to the recording head selection switch 12 based on the rotation phase detection signal inputted from the rotation phase detector 20. The switching signal generator 21 further generates to output a reproducing head switching signal Ssr to the reproducing head selection switch 13 and also to the frame phase detector 30a via the line L1.

The reproduction signal processor 14 is connected to the reproducing head selection switch 13, demodulating the reproduction signal from the reproducing head 15a or 15b to generate a demodulated reproduction signal Sr2'. The camera number detector 23 is connected to the reproduction signal processor 14, obtaining the input of the demodulated reproduction signal Sr2'. The first identifying signal detector 231 of the camera number detector 23 detects the camera number N of the reproduction signal frame based on the identifying signal Sid obtained by decoding the synchronization signal auxiliary information region 3044 of each recording unit block 401 structuring the video region 303 of the reproduction data. At the same time, the second identifying signal detector 232 also detects the camera number N of the reproduction signal frame based on the identifying signal Sid obtained by decoding the video additional information region 3042 of the video region 303. The selection switch 233 selects the first identifying signal detector 231 based on the system controller 50 during high-speed reproduction, while selecting the second identifying signal detector 232 during normal reproduction.

The error correction disabled flag generator 25 is connected to the reproduction signal processor 14, determining whether there is an error in the demodulated reproduction signal Sr2' and generating an error correction disabled flag signal SF indicating that correction is disabled when there is an error and the error cannot be corrected.

The memory 24 is connected to the reproduction signal processor 14, the camera number detector 23, and the error correction disabled flag generator 25, obtaining the inputs of the demodulated reproduction signal Sr2', the identifying signal Sid, and the error correction disabled flag signal SF therefrom, respectively. The memory 24 stores a reproduction signal Sr2'(N) of a desired camera number in a location corresponding to the camera number N in a field or frame unit based on the camera number N detected according to the identifying signal Sid, only when the error correction disabled flag signal SF is not inputted. The memory 24 further reads out the reproduction signal Sr2'(N) of the corresponding camera number N based on the identifying signal Sid.

The frame retriever 26 is connected to the camera number detector 23, retrieving the reproduction signals Sr2'(N) for one frame of the corresponding camera number N based on the identifying signal Sid. The frame retriever 26 then slow-reproduces the frame of the reproduction signals Sr2' (N) of the corresponding camera number N at a first speed not more than single speed and then retrieves the frame of the desired camera number N at a second speed faster than the first speed. By repeating this process, only the video signals of the corresponding camera number N are reproduced at high speed without noise.

The tape controller 17 controls the magnetic tape 4 to make it run at a desired speed so that the phase in the frame does not become constant.

Described below is a method for recording monitoring video from each of the plurality of cameras CM1 to CMn in the above described video recording and reproducing apparatus IRP1, and next described is a method for playing-back monitoring video SvN of the desired camera number N in order to check a state of a monitored place.

The video signals SvN (N=1 to n) from the plurality of television cameras CM1 to CMn are sequentially switched for each frame by the frame switcher 2 and supplied to the digital signal processor 103. The digital signal processor 103 subjects the inputted video signal SvN to digital processing to generate a digital video signal SdN. The identifying signal adders 10a and 10b add the camera number identifying signal Sid to identify that each of recording data, created by the digital signal processor 103, is the video signal SvN respectively output from the corresponding cameras CMN.

The identifying signal Sid is repeatedly added to the synchronization signal additional information region 3044 of each recording unit block 401 structuring the video region 303 and to each recording unit block 401 structuring the video additional information region 3042 in the video region 303, or distributed and added over the entire recording unit blocks 401. Since the video region 303 has a plurality of synchronization signal auxiliary information regions 3044, a plurality of camera number identifying signals Sid are recorded in one track. On the other hand, since the video additional information region 3042 exits in not all of the recording unit block 401 but in only a prescribed location in one track, the location where the identifying signal Sid is recorded relating to the video region 3042 is limited to a specified location in one track. That is, the maximum number of identifying signals Sid to be added to the synchronization signal auxiliary information region 3044 equals to the number of recording unit blocks 401 structuring the video region 303, while the maximum number of identifying signals Sid to be added to the video additional information region 3042 equals to the number of recording unit blocks structuring the video additional information region 3042.

The recording signal processor 11 performs processing such as modulation for recording the recording data with the camera number identifying signal Sid added on the magnetic tape 4 by the identifying signal adders 10a and 10b. According to the recording head switching signal Ssw, the recording head selection switch 12 selectively provides the recording magnetic head 16a or 16b with a recording signal Sr(N). The first recording magnetic head 16a and second magnetic head 16b each record the provided recording signal Sr(N) on the magnetic tape 4.

With the tape controller 17 driving the capstan motor 18 to run the magnetic tape 4 at a desired tape speed, the recording signal Sr(N) recorded on the magnetic tape 4 in the above described manner is reproduced as a reproduction signal Sr' from the magnetic tape 4 by the first reproducing magnetic head 15a and second reproducing magnetic head 15b.

That is, the tape controller 17 transfers the magnetic tape 4 at the first speed for the frame of the desired camera number N and at the second speed for the other frames. The capstan motor 18 pinches the magnetic tape 4 between the motor and a pinch roller (not shown) to run the magnetic tape. At this time, the control signal detector 31 detects the control signal Sc reproduced by the control head 40 to output the control signal Scp having the period of one frame to the counter 32. The counter 32 is reset with this control pulse signal Scp, counting the capstan FG signal Sfc inputted from the capstan FG signal detector 33 to output the control pulse signal Scp to the sampler 34.

The sampler 34 samples the control pulse signal Scp to generate a scan position signal Sps1 based on the reproducing head switching signal Ssr inputted from the switching signal generator 21. The value of the scan position signal Sps1 shows which position of the recording signal Sr of one frame recorded on the magnetic tape 4 the reproducing head 15a or 15b is scanning. Therefore, the tape controller 17 controls the capstan motor 18 in order not to make the scan position constant.

As a result, as shown in FIG. 4, the value of the pulse count signal Spc to be sampled based on the reproducing head switching signal Ssr is shifted, resulting in shift of the scan position in the frame and shift of the scanned recording unit block. In this way, by shifting for each scanning the scan position of the frame on the magnetic tape on which monitoring images from a desired surveillance camera are recorded based on frame phase information (the value of the pulse count signal Spc) in the frame on which the camera number is recorded, monitoring images from the other cameras are not mixed. It is also possible to view always updated monitoring images from the desired surveillance camera on one screen. Furthermore, it is possible to view the recorded images of the desired camera number with fast-forward replay or fast-reverse replay.

The reproduction signal is switched by the reproducing head selection switch 13 according to the head switching signal and supplied to the reproduction signal processor 14. The reproduction signal processor 14 subjects the reproduction signal to demodulation processing to obtain a demodulated reproduction signal. The camera number detector 23 detects the camera number N added to the demodulated reproduction signal Sr2' to reproduce the identifying signal Sid. That is, the camera number detector 23 decodes the synchronization signal auxiliary information region 3044 or the video additional information region 3042 of the demodulated reproduction data to detect the camera number N of the reproduced frame.

Based on the detected camera number N according to the identifying signal Sid outputted from the camera number detector 23, the memory 24 stores the demodulated reproduction signal Sr2' of the camera number N in a location according to the camera number N of which image reproduction the user desires instructed from the system controller 50. That is, with the detected camera number N, the memory 24 stores the recording unit block data 3045 in a location according to the track number in the frame recorded in the synchronization signal auxiliary information region 3044 of the recording unit block 401 and the block number in the track.

Further, when the camera number N is detected in the video additional information region 3042, the memory 24 stores the data in a location according to the track number in the frame recorded in the synchronization signal auxiliary information region 3044 of the recording unit block 401 of the track including the video additional information region 3042, and the block number in the track. Next, when another demodulated reproduction signal other than that of the desired camera number is inputted to the memory 24, the memory 24 stores the demodulated reproduction signal in a location other than that where the demodulated reproduction signal Sr2' of the desired camera number N has been recorded. That is, the memory 24 repeatedly stores the demodulated regeneration data Sr2' for each frame unit, thereby updating the demodulated reproduced data Sr2' stored in the memory 24.

However, when the error correction disabled flag SF is inputted from the error correction disabled flag generator 25 to the memory 24, the demodulated reproduction signal Sr2' is not written into the memory 24. That is, when there is an error in the reproduction signal of the desired camera number, the memory 24 does not store in itself the current demodulated reproduction signal Sr2' inputted from the reproduction signal processor 14. Using the stored demodulated reproduction signal Sr2' information of the desired camera number of the immediately preceding frame, the memory 24 corrects the error of the current demodulated reproduction signal Sr2' and then outputs the resultant signal to the video signal output device 8. The demodulated reproduction signal Sr2' can be processed by the memory 24 for each synchronization signal region 3043 of the recording unit block 401, based on the camera number N recorded in the synchronization signal auxiliary information region 3044 of each recording unit block 401 structuring the video region 303. That is, it is possible to correct the image of the present demodulated reproduction signal Sr2' with an error not by replacing the whole image by the image of the immediately preceding frame but by replacing only the necessary part of the image by the corresponding part of the image of the preceding frame. Needless to say, the whole image of the current demodulated reproduction signal Sr2' with an error may be replaced by the image of the preceding frame for speedy processing and the like. In this way, the corrected signal is displayed on the monitor 9 through the video signal output means 8.

Further, at the time of correction, it is also possible to interpolate not using reproduction signal information of the desired camera number stored in the memory 24 but using only the video signal of the same time period.

In this way, with the surveillance camera number recorded in the video signal, when a user wants to view only the monitoring images from a desired camera by reproduction from the magnetic tape on which monitoring images from a plurality of surveillance cameras are recorded, the camera number is detected from the video signal and only the video signal corresponding to the camera number is stored in memory according to the camera number. When there is an error, the video signal is replaced by information of the same camera number from the memory. Correction with relatively high correlation using only the video from the same camera number is thus possible even when data is compressed to make interpolation from the surroundings of the error part difficult. In this way, when there is an error, monitoring images of the other cameras are not mixed and it is possible to view only the monitoring images from the desired camera. The camera number is added to the video signal from each of the plurality of cameras to which the camera number is assigned and recorded on the magnetic tape. Based on the camera number recorded on the magnetic tape, the recorded video of the desired camera is stored in memory, and when there is an error, replacement by the stored video can be made. During normal replay, even with an error, correction only with the video signal in which the desired camera number is recorded allows video playback of the desired camera number.

Describing in further detail, the camera number is detected from the recording unit block or the video additional information region of the video signal, and only the video signal corresponding to the camera number is stored in memory according to the camera number. When there is an error, the video signal is replaced by information of the same camera number from the memory. Correction with relatively high correlation is thus possible even when data is compressed to make interpolation from the surroundings of the error part difficult. Therefore, when there is an error, monitoring images of the other cameras are not mixed and it is possible to view only the monitoring images from the desired camera. In this way, the camera number is added to each recording unit block of a video signal from each of the plurality of cameras to which the camera number is assigned, and recorded on a magnetic tape. Based on the camera number recorded on the magnetic tape for each recording block, the recorded video of the desired camera number is stored in memory, and when there is an error, replacement by the stored video can be made. Therefore, correction can be made with only the video signal which can be reproduced at high speed and in which the desired camera number is recorded for each recording unit block, and it is possible to playback video of the desired camera number even when there is an error. Further, the camera number which is recorded in the video additional information region is detected and correction with only the video signal in which the desired camera number is recorded is made, thereby allowing normal replay of only the video of the desired camera number even when there is an error.

When the camera number is added for each recording unit block, it is possible to detect the camera number during high-speed replay, while the entire playback is not possible in a system with a large number of cameras because the synchronization signal auxiliary information region does not allow sufficient space to which the camera number is added. On the other hand, when the camera number is added to the video additional information region, it is impossible to detect the camera number during high-speed replay, while normal replay is possible in a system with a large number of cameras because the video additional information region can allows more space for the camera number compared with the synchronization signal auxiliary information region.

Furthermore, although the limited region to which the first identifying signal is added for each recording unit results in the limited number of identifiable cameras N, the camera number N can be detected for each recording unit during high-speed replay. Moreover, during normal replay, detecting the second identifying signal added to the video additional information region which is a predetermined region of one track eases the limitation of the storage region of the identifying signal and also eases the limitation of the number of cameras. Therefore, since the camera number can be detected for each recording unit during high-speed replay, although the number of cameras is limited, when video to be high-speed replayed has an error, it is possible to replace the erroneous video by part of or the entire video of the immediately preceding frame shot by the same camera. Further, since the camera number N can be detected from the video additional information region which is a predetermined region of one track can be detected at normal replay, even in a system with a large number of cameras, it is possible to replace the erroneous video by part of or the entire video of the preceding frame shot by the same camera.

As described above, with the error correction disabled flag generator 25, when a user wants to view only the monitoring images shot by the desired camera from the magnetic tape on which the monitoring images from the plurality of surveillance cameras are recorded, the camera number is detected from the video signal and only the video signal corresponding to the camera number is stored in memory according to the camera number. When error correction is impossible, the video signal is not written in memory. Therefore, even when data is compressed and the like to make interpolation from the surrounding of the error part difficult, correction with only the video of the same camera number of the immediately preceding frame is possible without monitoring images of the other cameras mixed into, and it is possible to view only the monitoring images from the desired camera. In this way, recorded video of the desired camera number is stored in memory means based on the camera number recorded on the magnetic tape, and when error correction is impossible, memory is not updated. As a result, correction with only the video signal of the immediately preceding frame from the same camera number allows video replay of only the desired camera number.

(Second Embodiment)

Figure 7:
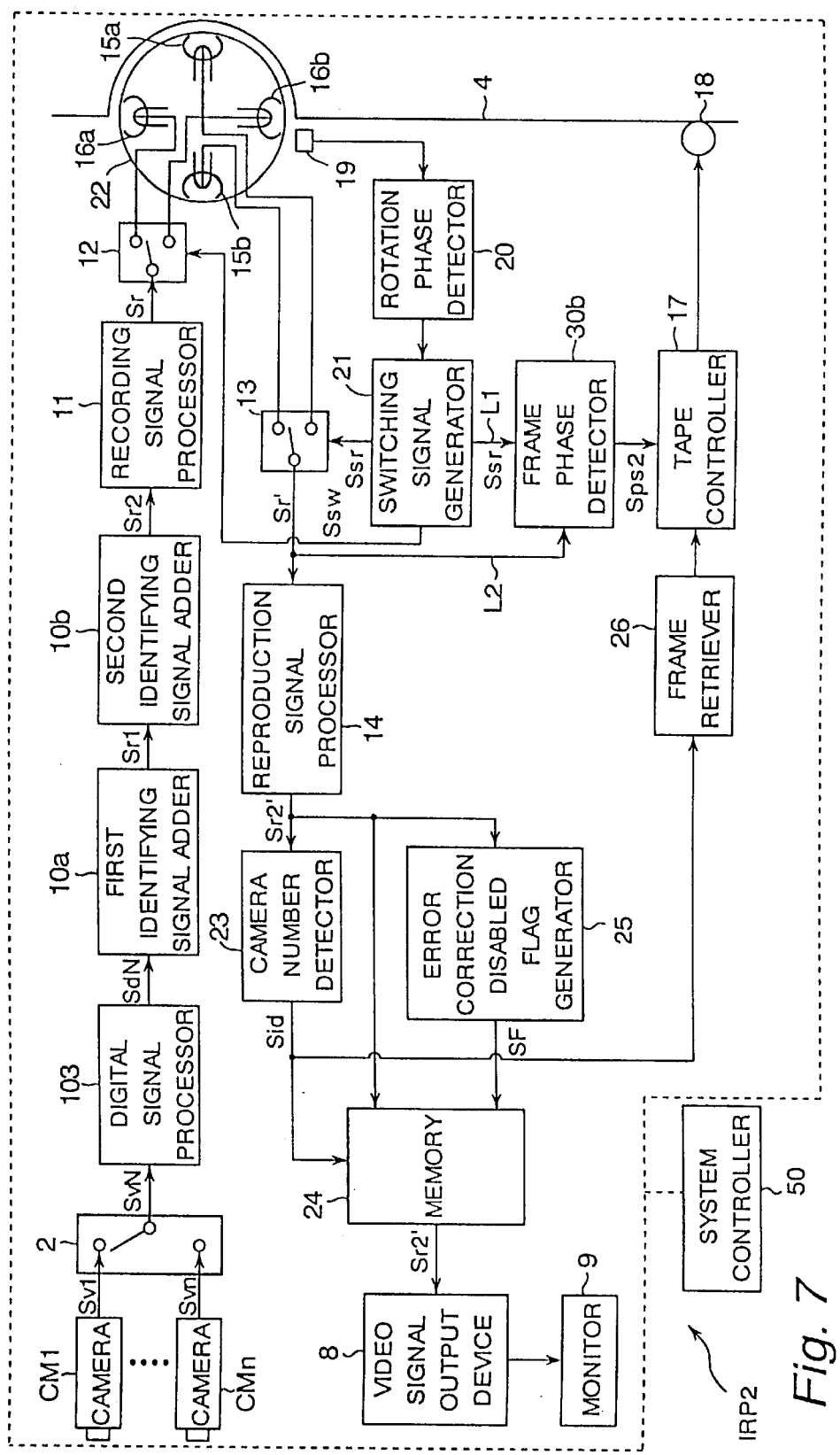
FIG. 7 is a block diagram showing a second preferred video recording and reproducing apparatus according to the present invention.

Described below is a video recording and reproducing apparatus according to a second embodiment of the present invention referring to FIGS. 7, 8, and 9. As shown in FIG. 7, a video recording and reproducing apparatus IRP2 in the present embodiment includes a frame phase detector 30b in place of the frame phase detector 30a of the video recording and reproducing apparatus IRP1 shown in FIG. 1, and also has the structure in which the frame phase detector 30b is connected though a line L2 to the output port of the reproducing head selection switch 13. Therefore, only described below is the structure and operation unique to the video recording and reproducing apparatus IRP2.

Figure 8:
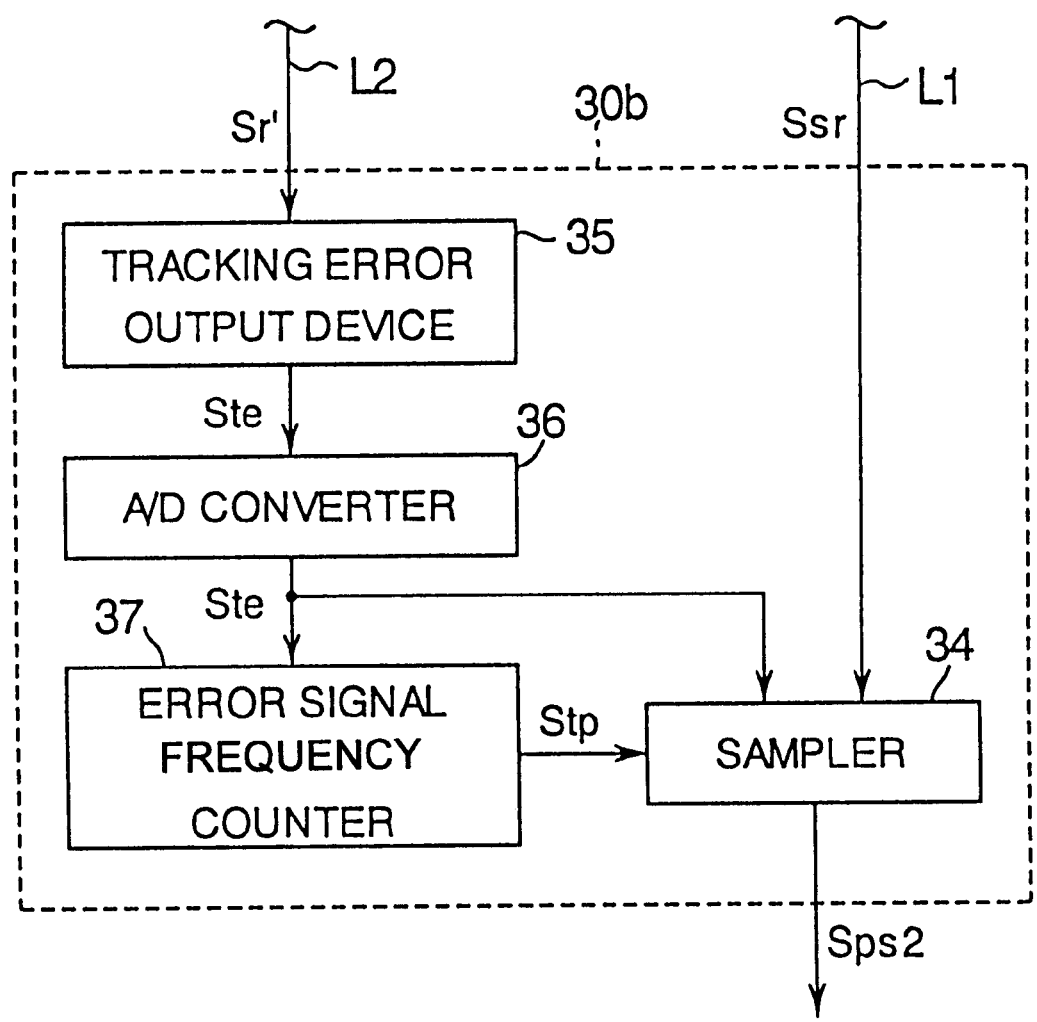
FIG. 8 is a block diagram of a frame phase detector shown in FIG. 7.

Referring to FIG. 8, the structure of the frame phase detector 30b is described. The frame phase detector 30b has a sampler 34, a tracing error output device 35, an A/D converter 36, and an error signal frequency counter 37. The tracking error output device 35 is connected through the line L1 to the switching signal generator 21 to obtain the input of the reproducing head switching signal Ssr and is coupled through the line L2 to the output of the reproducing head selection switch 13 to obtain the input of the reproduction signal Sr' reproduced from the magnetic tape 4 in the reproducing magnetic heads 15a or 15b. The tracking error output device 35 detects a tracking error of ATF from the reproduction signal to generate a tracking error signal Ste.

The A/D converter 36 is connected to the tracking error output device 35 to obtain the input of the tracking error signal Ste. The tracking error output device 35 then A/D converts the tracking error signal Ste to output to the sampler 34 and the error signal frequency counter 37.

The error signal frequency counter 37 detects the frequency of the digitized tracking error signal Ste to generate a tracking error frequency detection signal Stp.

The sampler 34 is connected through the line L1 to the switching signal generator 21 to obtain the input of the reproducing head switching signal Ssr and is also connected to the A/D converter 36 and the error signal frequency counter 37 to obtain the inputs of the digitized tracking error signal Ste and the tracking error frequency detection signal Stp, respectively. The sampler 34 then samples the tracking error signal Ste and the tracking error frequency detection signal Stp based on the reproducing head switching signal Ssr to generate a scan position signal Sps2, and outputs the scan position signal Sps 2 to the tape controller 17.

Figure 9:
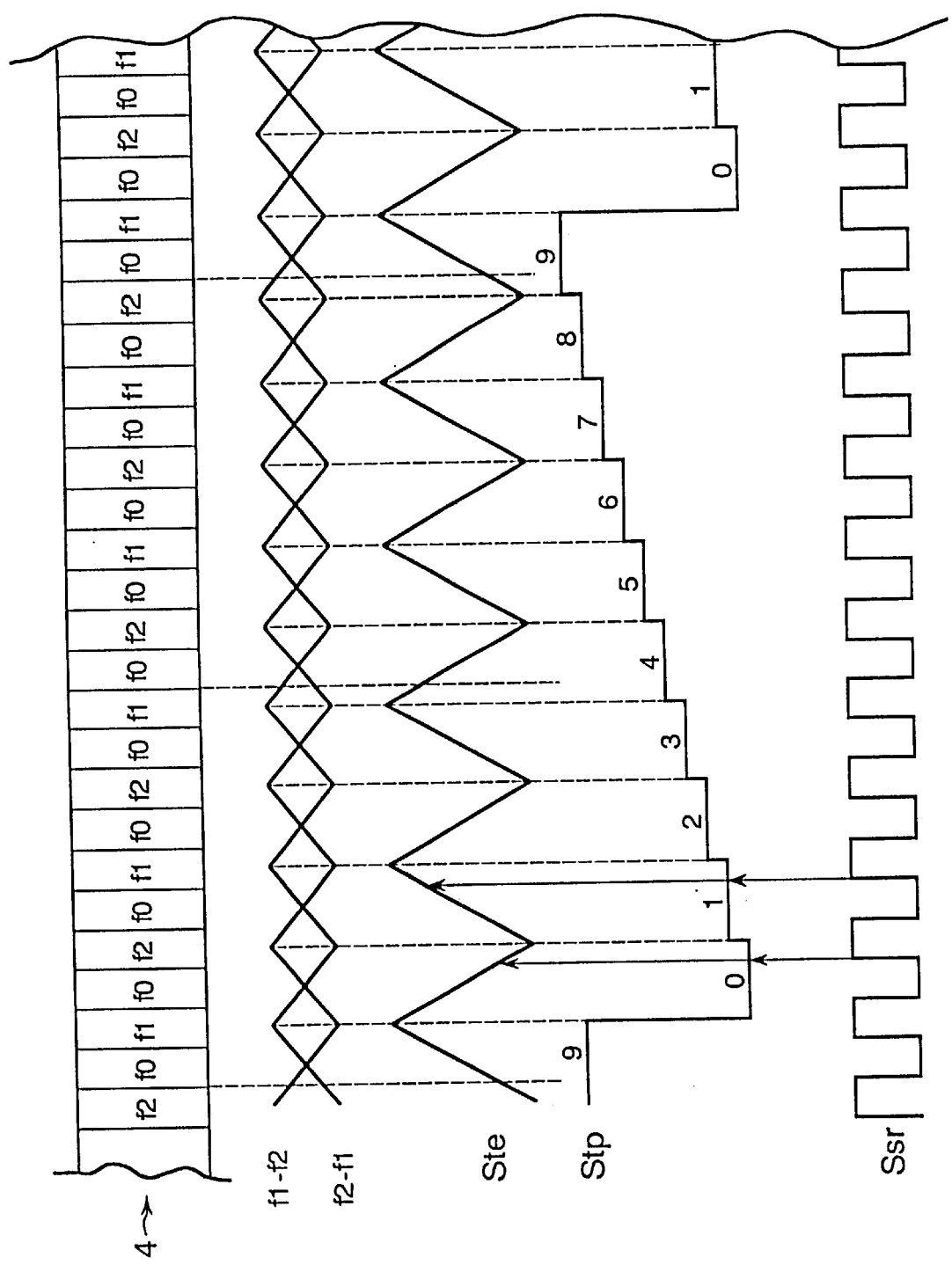
FIG. 9 is a descriptive diagram of operation of the frame phase detector shown in FIG. 8.

Referring to FIG. 9, described is sampling operation in the frame phase detector 30b. In the drawing, tracking control pilot signals f2, f0, f1 and f0 are repeatedly recorded on the magnetic tape 4. Using outputs obtained by reproduction of these pilot signals, the output of the pilot signal f2 is subtracted from the output of the pilot signal f1 and vice versa, and the two outputs of f1-f2 and f2-f1 are operated to obtain ATF error signals. The tracking error signal Ste is thus obtained having a waveform formed of alternately appearing crests and troughs corresponding to crests and troughs of the ATF error signals f1-f2 and f2-f1. The tracking error frequency detection signal Stp of a step waveform having sequential 0 to 9 is generated corresponding to the crest and trough parts of the tracking error signal Ste. The tracking error frequency detection signal Stp and the tracking error signal Ste are sampled with the reproducing head switching signal Ssr to obtain the scan position signal Sps2.

The video signals Sv1 to Svn shot by the plurality of television cameras CM1 to CMn are processed as described in the first preferred embodiment and then recorded on the magnetic tape 4. The video signal Sr recorded on the magnetic tape 4 is read by the reproducing magnetic heads 15a and 15b to be displayed on the monitor 9 after the above processing. It should be noted that the tracking error output device 35 of the frame phase detector 30b detects the ATF error signal from the reproduction signal reproduced by the reproducing magnetic heads 15a and 15b, and outputs the tracking error signal Ste to the A/D converter 36. The A/D converter 36 digitizes the tracking error signal Ste to output to the sampler 34 and the error signal frequency counter 37. The error signal frequency counter 37 measures the frequency of the tracking error signal Ste and outputs the tracking error frequency detection signal Stp to the sampler 34. The sampler 34 samples the tracking error signal Ste and the tracking error frequency detection signal Stp based on the reproducing head switching signal Ssr to generate a scan position signal Sps 2. The value of the scan position signal Sps2 represents where the reproducing magnetic heads 15a and 15b are scanning in the frame. The tape controller 17 controls the capstan motor 18 so that the scan position does not become constant. As a result, the values of the tracking error frequency detection signal Stp and tracking error signal Ste varies according to the reproducing head switching signal Ssr, the scan position in the frame and the scan recording unit block are also shifted. The following operation is the same as that in the above first preferred embodiment.

(Third Embodiment)

Figure 10:
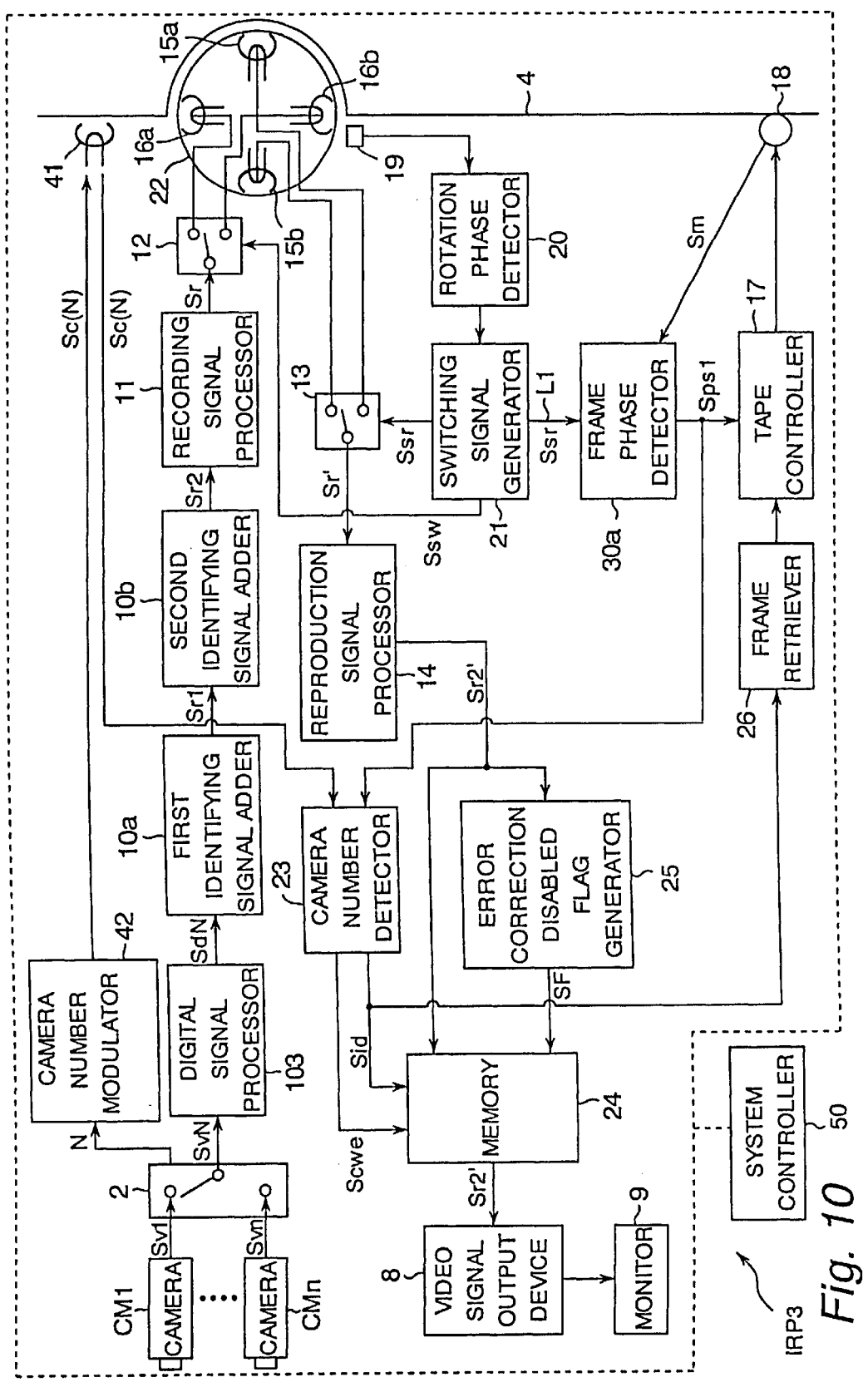
FIG. 10 is a block diagram showing a third preferred video recording and reproducing apparatus according to the present invention.

Described below is a video recording and reproducing apparatus according to a third embodiment of the present invention referring to FIGS. 10, 11, and 12. As shown in FIG. 10, a video recording and reproducing apparatus IRP3 according to the third embodiment has a structure in which a control head 41 and a camera number modulator 42 are newly provided for the video recording and reproducing apparatus IRP 1 shown in FIG. 1. Furthermore, the video recording and reproducing apparatus IRP3 is different from the video recording and reproducing apparatus IRP1 in that, in place of the output of the reproduction signal processor 14, a control head 41 output Sc(N) and the frame phase detector 30a output Sps1 are coupled to the input of the camera number detector 23.

The camera number modulator 42 is connected to a frame switcher 2, and in order to record the camera number N selected by the frame switcher 2 on the control track 301 of the magnetic tape 4, modulates the control signal Sc recorded on the control track 301. The control head 41 is connected to the camera number modulator 42 to obtain the input of the modulated control signal Sc and record and also to record and reproduce the control signal Sc on the control track 301 of the magnetic tape 4.

Figure 11:
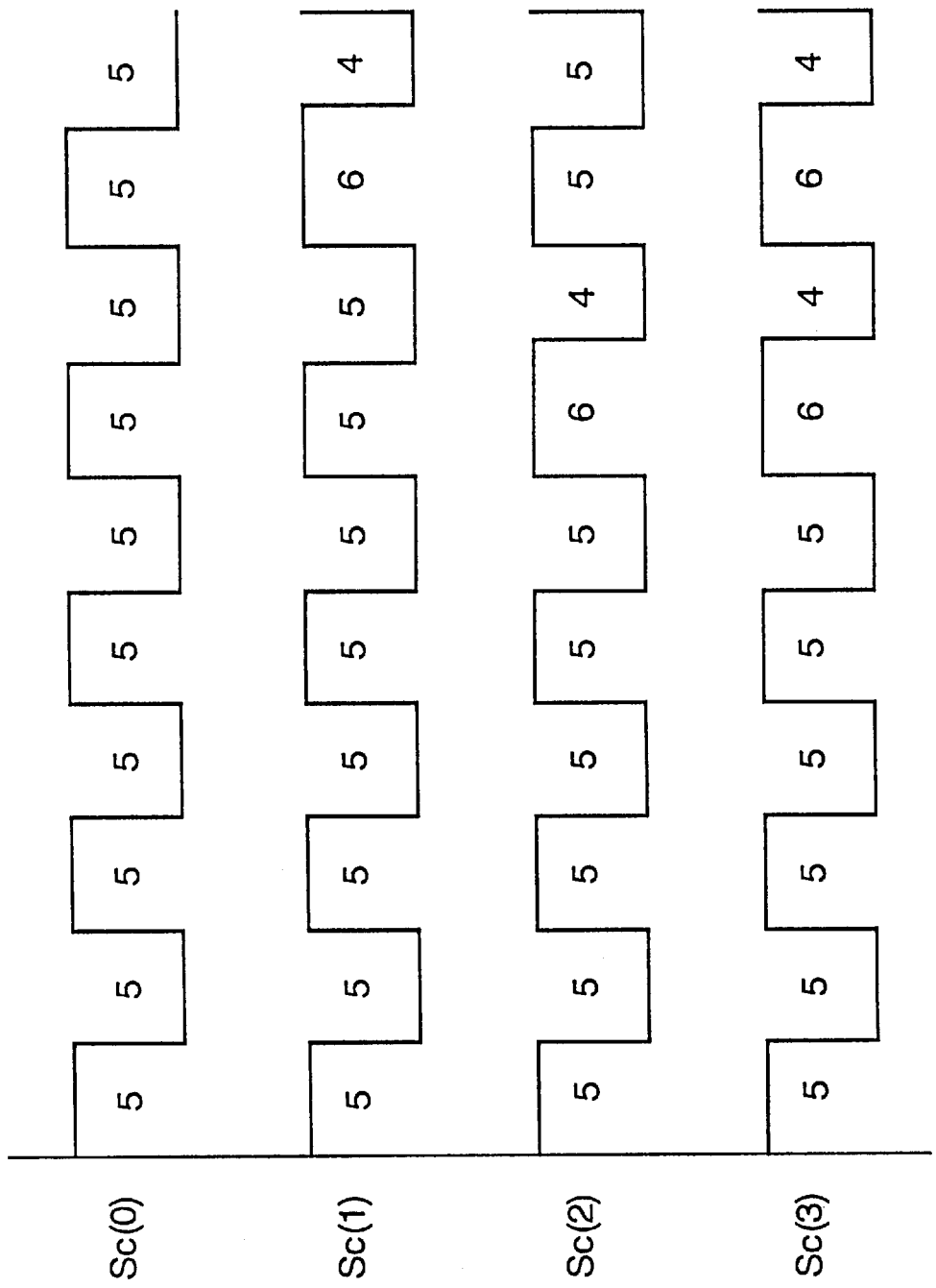
FIG. 11 is a descriptive diagram of a modulation method by a camera number modulator shown in FIG. 10.

FIG. 11 shows waveforms of the control signal Sc modulated by the camera number modulator 42. In the drawing, Sc(0), Sc(1), Sc(2), and Sc(3) show examples of waveforms of the control signal Sc(N) when the camera number N is 0, 1, 2, and 3, respectively. In this way, changing the duty ratio of the control signal Sc(N) causes modulation of the camera number N. In Sc(0), its duty ratio is 5:5 in the first to fifth periods. In Sc(1), its duty ratio is 5:5 in the first to fourth periods, and 6:4 in the fifth period. In Sc(2), its duty ratio is 5:5 in the first to third periods, 6:4 in the fourth period, and 5:5 in the fifth period. In Sc(3), its duty ratio is 5:5 in the first to third periods, and 6:4 in the fourth and fifth periods.

Particularly described next is operation unique to the above structured video recording and reproducing apparatus IRP3. The video signals from the plurality of cameras CM1 to CMn are sequentially switched by the frame switcher 2 and inputted to the digital signal processor 103. Simultaneously, the camera number N of the television camera CMN selected by the frame switcher 2 is inputted to the camera number modulator 42. The camera number N inputted to the camera number modulator 42 is recorded by the control head 41 as a modulated control signal Sc(N) having the duty ratio shown in FIG. 11 on the control track 301 of the magnetic tape 4. A method for recording and reproducing a video signal on the magnetic tape 4 is basically the same as the above described method in the first and second embodiments.

During reproduction, the modulated control signal Sc(N) reproduced by the control head 41 is demodulated by the camera number detector 23 and the camera number N is detected. Based on the detected camera number N, as in the first and second embodiments, from among the recording unit blocks included in reproduction data Sr2' from the reproduction signal processor 14, the memory 24 stores the recording unit block data according to the above detected desired camera number in a location according to the track number in the frame recorded in the synchronization signal auxiliary information region 3044 of the recording unit block and the block number in the track. The frame reproduction data stored in the memory 24 is displayed on the monitor 9 through the video signal output device 8.

Figure 12:
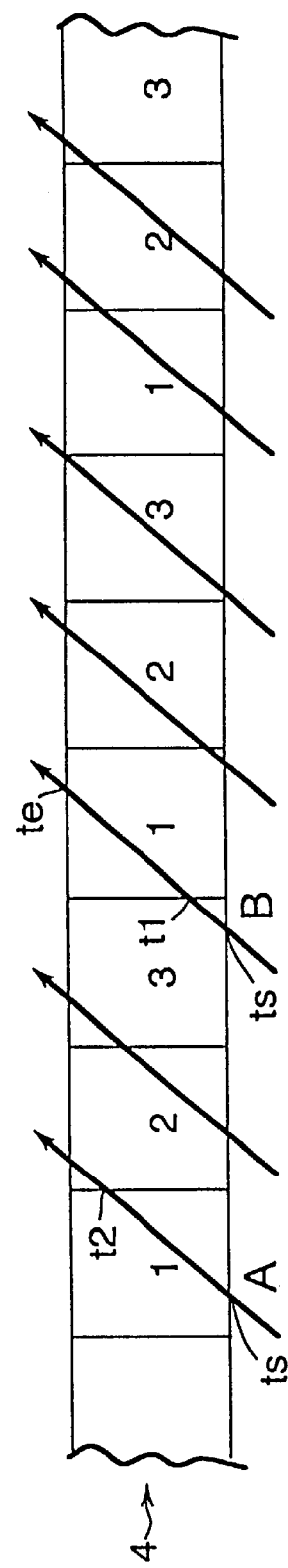
FIG. 12 is a descriptive diagram of memory control operation of a camera number detector shown in FIG. 10.

Referring to FIG. 12, described is operation during search replay such as fast-forward replay, fast-backward replay or the like. In the drawing, a plurality of sections vertically dividing the magnetic tape 4 represent recording tracks, a number shown in the section represents the camera number N written in the control track 301, and arrows diagonally across the track from bottom left represent scanning trails of the reproducing head 15a or 15b. The present embodiment shows a case in which video Sv1 of a television camera CM1 is reproduced from the magnetic tape 4 on which video from three cameras CM1, CM2, and CM3, where N=1, 2, and 3. During a search, the camera number N and its frame phase are detected from the control signal Sc modulated as described above, and data on the camera number N=1 are estimated from the forwarding speed of the magnetic tape 4, the camera number N and the frame phase.

When the forwarding speed of the magnetic tape 4 is ten times +a times the standard forwarding speed and when the camera number N=1 and the frame phase is A, reproduction data between time ts and t2 is processed as the camera number 1. When the frame phase is B, reproduction data between time t1 and te is processed as the camera number 1. The data on the desired camera number N is thus retrieved and reproduced.

In the present embodiment, the camera number N is always detected from the camera number detector 23 and only the data corresponding to the camera number N is stored in the memory 24. Therefore, it is possible to view only the monitoring images from a desired camera without monitoring images from the other cameras mixed into. Further, the camera number is modulated and then recorded in the control track of the magnetic tape, allowing the recorded video of the desired camera number to be recorded in memory for each recording unit block based on the camera number. Therefore, during fast-forward replay and fast-backward replay, only the video signal in which the desired camera number is recorded is read from the memory 24, allowing high-speed replay of video of only the desired camera number. Furthermore, it is also possible to view only the recorded video of the desired camera number from the memory by fast-forward replay and fast-backward replay. As a result, it is possible to readily view the video from a specific camera and retrieve desired video in a short time.

(Fourth Embodiment)

Figure 13:
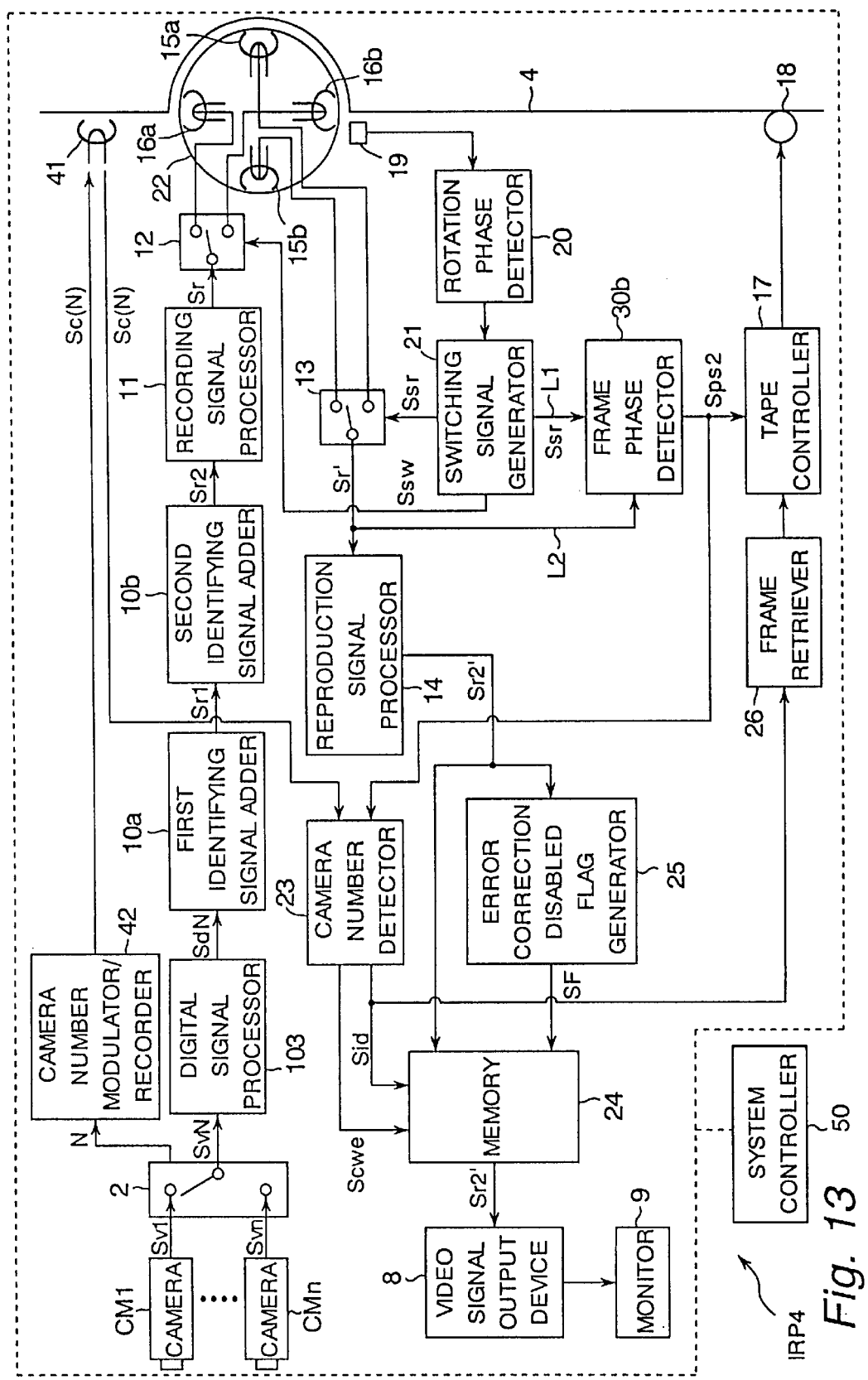
FIG. 13 is a block diagram showing a fourth preferred video recording and reproducing apparatus according to the present invention.
Figure 14:
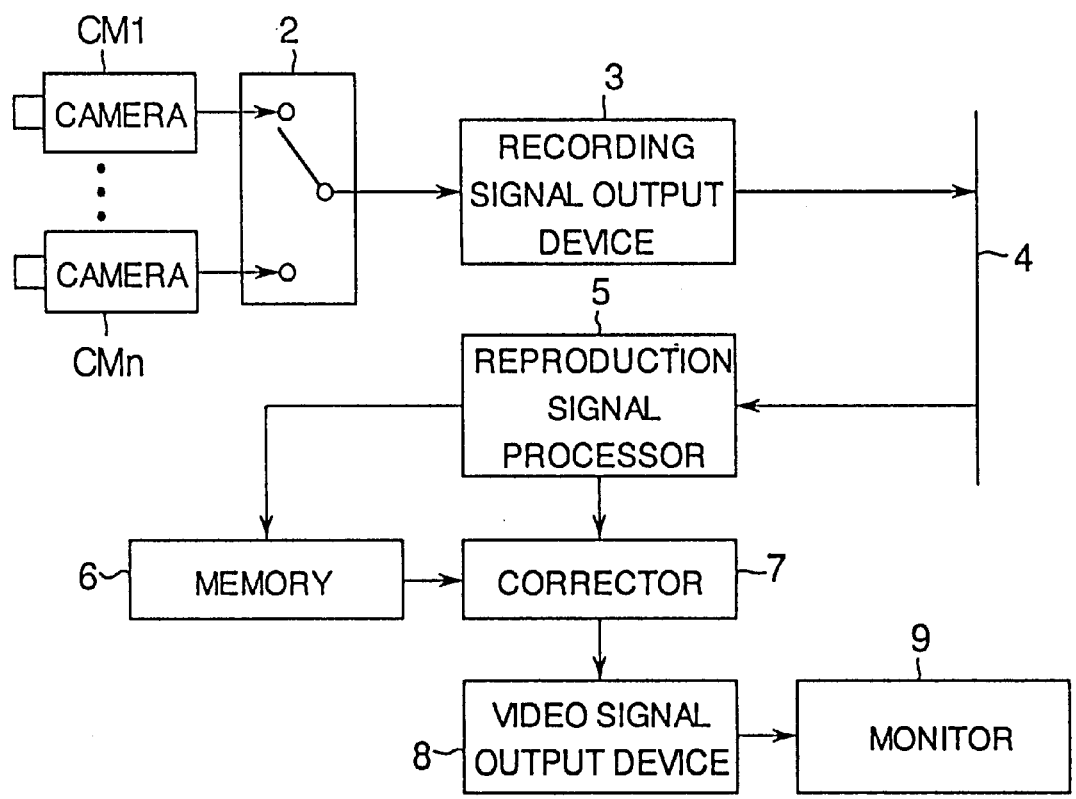
FIG. 14 is a block diagram showing a conventional video recording and reproducing apparatus.
Figure 15:
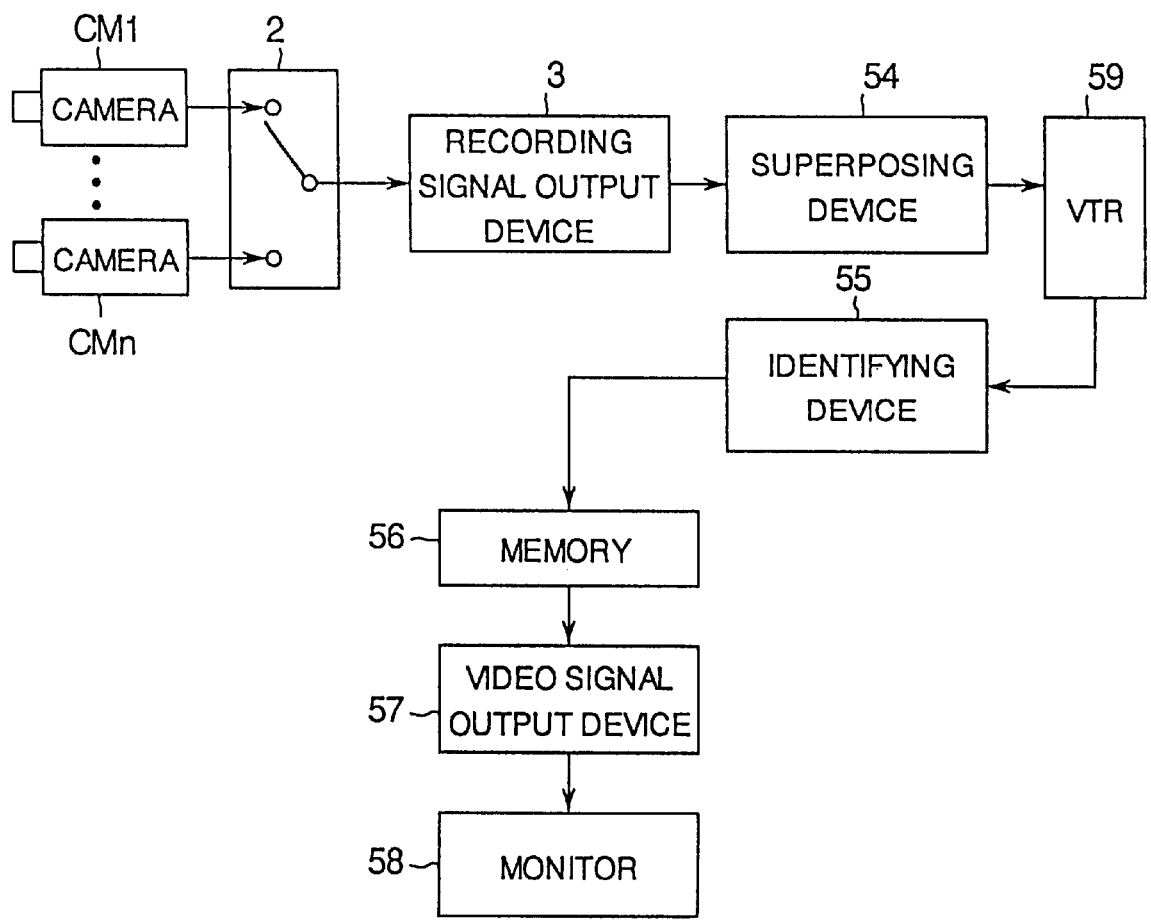
FIG. 15 is a block diagram showing another conventional video recording and reproducing apparatus which is different from the one shown in FIG. 14.

Described next is a video recording and reproducing apparatus according to a fourth embodiment of the present invention referring to FIG. 13. A video recording and reproducing apparatus IRP4 according to the fourth embodiment has a structure in which the control head 41 and the camera number modulator 42 of the video recording and reproducing apparatus IRP3 shown in FIG. 10 are newly provided for the video recording and reproducing apparatus IRP2 shown in FIG. 2. The structure and its operation are the same as those of common portions of the above described video recording and reproducing apparatus IRP2 and video recording and reproducing apparatus IRP3, and therefore their description is omitted.

While the invention has been described and illustrated in detail, it is clear that the foregoing description is illustrative and not restrictive. The spirit and scope of the invention is restricted only by the words in the appended claims.

INDUSTRIAL APPLICABILITY

The present invention is suitable for a video recording and reproducing apparatus for recording and reproducing video signals from a plurality of cameras, and specifically a video recording and reproducing apparatus for use in a surveillance system which fixedly monitors a plurality of places.

What is claimed is:

1. A video signal recording and reproducing apparatus for recording video signals inputted from a prescribed number of different video signal sources and reproducing the recorded video signals, comprising:

first selecting means for sequentially selecting one of said video signals in prescribed order and outputting a first video signal;

identifying signal adding means for adding to said first signal outputted from said first selecting means an identifying signal representing a corresponding video signal source to generate a second video signal;

recording signal processing means for recording said second video signal on a magnetic tape;

recording signal reproducing means for reproducing said second signal recorded on said magnetic tape to generate a third video signal;

reproduction signal processing means for demodulating said third video signal to generate a fourth video signal;

identifying signal detecting means for detecting said identifying signal from said fourth video signal;

memory means for storing said fourth video signal in relation to said detected identifying signal; and correcting means for generating, when said fourth video signal has an error, a fifth video signal with the error corrected from the signal stored in said memory means based on said identifying signal.

2. The video signal recording and reproducing apparatus according to claim 1, further comprising:

digital signal processing means for dividing said first video signal for each of recording units to generate a sixth video signal having a plurality of recording units; wherein said identifying signal adding means adds to said sixth video signal the identifying signal representing a corresponding video signal source for each of said recording units to generate said second video signal.

3. The video signal recording and reproducing apparatus according to claim 2, wherein said digital signal processing means adds a synchronization signal region and a synchronization signal auxiliary information region to each of said recording units of said sixth video signal.

4. The video signal recording and reproducing apparatus according to claim 3, wherein said digital signal processing means further adds a video additional information region to each of said recording units of said sixth video signal.

5. The video signal recording and reproducing apparatus according to claim 4, wherein said identifying signal adding means comprises:

first identifying signal adding means for adding a first identifying signal to said synchronization signal region; and second identifying signal adding means for adding a second identifying signal to the video additional information region;

said identifying signal detecting means comprises:

first identifying signal detecting means for detecting said first identifying signal from said fourth video signal;

second identifying signal detecting means for detecting said second identifying signal from said fourth video signal; and second selecting means for selecting said first and second identifying signals;

said memory means stores said fourth video signal in relation to the identifying signal selected by said second selecting means from among said first and second identifying signals; and when said fourth video signal has an error, said correcting means corrects the error included in said fourth video signal corresponding to the video signal selected by said first selecting means based on the identifying signal selected by said second selecting means; and further switches said switching means so as to output said first identifying signal during high-speed replay and the second identifying signal during normal replay.

6. The video signal recording and reproducing apparatus according to claim 2, wherein said correcting means generates an error correction disabled flag when detecting an uncorrectable error in said fourth video signal for each of said recording units; and said memory means does not store a recording unit having the uncorrectable error in said fourth video signal based on said error correction disabled flag.

7. A video signal recording and reproducing apparatus for recording video signals inputted from a prescribed number of different video signal sources and reproducing the recorded video signals, comprising:

first selecting means for sequentially selecting one of said video signals in prescribed order and outputting a first video signal;

identifying signal adding means for adding to said first signal outputted from said first selecting means an identifying signal representing a corresponding video signal source to generate a second video signal;

recording signal processing means for recording said second video signal on a magnetic tape;

recording signal reproducing means for reproducing said second video signal recorded on said magnetic tape to generate a third video signal;

reproduction signal processing means for demodulating said third video signal to generate a fourth video signal;

identifying signal detecting means for detecting said identifying signal from said fourth video signal;

memory means for storing said fourth video signal in relation to said detected identifying signal; and tape control means for controlling running speed of said magnetic tape at a desired speed; wherein said memory means stores said fourth video signal corresponding to a desired video signal source based on said identifying signal during high-speed replay.

8. The video signal recording and reproducing apparatus according to claim 7, further comprising:

digital signal processing means for dividing said first video signal for each of recording units to generate a fifth video signal having a plurality of recording units and also to add a synchronization signal region and a synchronization signal auxiliary region to each of the recording units; wherein said identifying signal adding means adds an identifying signal representing said video signal source to said synchronization signal auxiliary information region.

9. The video signal recording and reproducing apparatus according to claim 8, further comprising:

scan position detecting means for detecting a scan position in a frame where the identifying signal representing said video signal source is recorded and generating a scan position signal; wherein said tape control means controls running of said magnetic tape so as to vary a frame phase for each scanning based on said scan position signal.

10. The video signal recording and reproducing apparatus according to claim 7, comprising:

scan position detecting means for detecting a scan position in a frame where the identifying signal representing said video signal source is recorded and generating a scan position signal; wherein said tape control means controls running of said magnetic tape so as to vary a frame phase for each scanning based on said scan position signal.

11. The video signal recording and reproducing apparatus according to claim 10, wherein:

said scan position detecting means comprises:

control signal detecting means for recording a control signal on a control track of said magnetic tape and reproducing the recorded control signal;

capstan signal detecting means for detecting a rotation frequency of a capstan motor and generating a capstan FG signal;

counting means for counting based on said capstan FG signal and generating a pulse count signal, being reset with said reproduced control signal; and sampling means for sampling said pulse count signal at timing of switching between reproducing heads.

12. The video signal recording and reproducing apparatus according to claim 10, wherein said scan position detecting means comprises:
tracking error detecting means for detecting a pilot signal recorded on a track of said magnetic tape and generating a tracking error signal; and
sampling means for sampling said tracking error signal at prescribed timing; and
detects frame position information based on said tracking error signal sampled by said sampling means.

13. The video signal recording and reproducing apparatus according to claim 7, further comprising:

frame retrieving means for retrieving a frame corresponding to a desired video signal source based on said detected identifying signal; wherein
the apparatus slow-replays the frame which said frame retrieving means retrieves at a first speed not more than single speed, and repeats frame search at a second speed faster than the first speed, thereby allowing high-speed reproduction of a video signal of a desired camera number without noise.

14. A video signal recording and reproducing apparatus for recording video signals inputted from a prescribed number of different video signal sources and reproducing the recorded video signals, comprising:

first selecting means for sequentially selecting one of said video signals in prescribed order and outputting a first video signal;
video signal source information modulation means for modulating video signal source identifying information representing a video signal source corresponding to said first video signal to generate a control signal and also recording the control signal on a control track of a magnetic tape;
recording signal processing means for recording on said magnetic tape a second video signal obtained by adding an identifying signal representing a corresponding video signal source to said first video signal;
recording signal reproducing means for reproducing said second video signal recorded on said magnetic tape to generate a third video signal;
reproduction signal processing means for demodulating said third video signal to generate a fourth video signal;
identifying signal detecting means for detecting said identifying signal from said fourth video signal;
memory means for storing said fourth video signal in relation to said detected identifying signal; and
control signal reproducing means for reproducing said control signal from said control track.

15. The video signal recording and reproducing apparatus according to claim 14, further comprising:

tape control means for controlling running of said magnetic tape at a desired speed; wherein
said memory means stores said fourth video signal corresponding to a desired video signal source based on said identifying signal during high-speed replay.

16. The video signal recording and reproducing apparatus according to claim 15, comprising:

scan position detecting means for detecting a scan position in a frame where the identifying signal representing said video signal source is recorded and generating a scan position signal; wherein
the tape control means controls running of said magnetic tape so as to vary a frame phase for each scanning based on said scan position signal.

17. The video signal recording and reproducing apparatus according to claim 16, wherein said scan position detecting means comprises:
control signal detecting means for recording a control signal on a control track of said magnetic tape and reproducing the recorded control signal;
capstan signal detecting means for detecting a rotation frequency of a capstan motor and generating a capstan FG signal;
counting means for counting based on said capstan FG signal and generating a pulse count signal, being reset with said reproduced control signal; and
sampling means for sampling said pulse count signal at timing of switching between reproducing heads.

18. The video signal recording and reproducing apparatus according to claim 16, wherein said scan position detecting means comprises:
tracking error detecting means for detecting a pilot signal recorded on a track of the magnetic tape and generating a tracking error signal; and
sampling means for sampling said tracking error signal at prescribed timing; and
detects frame position information based on said tracking error signal sampled by said sampling means.

19. The video signal recording and reproducing apparatus according to claim 15, further comprising:

frame retrieving means for retrieving a frame corresponding to a desired video signal source based on said detected identifying signal; wherein
the apparatus slow-replays the frame which said frame retrieving means retrieves at a first speed not more than single speed, and repeats frame search at a second speed faster than the first speed, thereby allowing high-speed reproduction of a video signal of a desired camera number without noise.

* * * * *